United States Patent [19]

Lama et al.

[11] Patent Number: 4,707,122
[45] Date of Patent: Nov. 17, 1987

[54] METHOD AND APPARATUS FOR ELIMINATING EXPOSURE STROBING EFFECTS IN A DOCUMENT REPRODUCTION MACHINE

[75] Inventors: William L. Lama; Robert P. Loce, both of Webster, N.Y.

[73] Assignee: Xerox Corporation, Stamford, Conn.

[21] Appl. No.: 910,708

[22] Filed: Sep. 24, 1986

[51] Int. Cl.$^4$ ............................................. G03B 27/72
[52] U.S. Cl. ......................................... 355/71; 355/8
[58] Field of Search .................... 355/3 R, 8, 14 E, 71

[56] References Cited

U.S. PATENT DOCUMENTS

| | | |
|---|---|---|
| 865,324 | 10/1887 | Hinton . |
| 3,466,127 | 9/1969 | Hauer ...................................... 355/40 |
| 3,488,118 | 1/1970 | Parrent, Jr. et al. ................... 355/71 |
| 3,967,894 | 7/1976 | Tsilibes ............................... 355/67 X |
| 3,998,539 | 12/1976 | Kidd ......................................... 355/4 |
| 4,132,477 | 1/1979 | Watabe et al. ..................... 355/71 X |
| 4,226,527 | 10/1980 | Lama et al. ............................ 355/71 |
| 4,305,650 | 12/1981 | Knox .................................. 355/71 X |
| 4,355,891 | 10/1982 | Cole et al. ......................... 355/71 X |
| 4,533,238 | 8/1985 | Miyazaki ....................... 355/14 E X |

*Primary Examiner*—Patrick R. Salce
*Assistant Examiner*—Marc S. Hoff

[57] ABSTRACT

Exposure modulation (strobing) at a photoreceptor surface due to mechanical vibration of the photoconductor is eliminated by placing a filter with appropriate transmission characteristics in the optical path. The transmission characteristics necessary to achieve zero strobing include an incidence profile having a zero Fourier transform at the vibration frequencies.

4 Claims, 7 Drawing Figures

METHOD AND APPARATUS FOR ELIMINATING EXPOSURE STROBING EFFECTS IN A DOCUMENT REPRODUCTION MACHINE

This invention relates to an electrophotographic reproduction system which includes a scanning illumination system and in particular to a method and apparatus for compensating for exposure strobing effects due to mechanical vibration in the scanning system.

In a document reproduction system which incorporates a scanning optical system (moving illumination source, reflectors, mirrors, projection lens) to project an image of a document onto a moving photoconductor surface, the exposure of a point on the photoreceptor is equal to the total irradiance received by the point as it scans through an exposure slit. When a uniform density document is being imaged, a uniform exposure of the photoconductor is desired. If the photoconductor velocity and the irradiance profile are constant in time, then all points on the photoconductor will receive the same exposure. However, when the irradiance profile is modulated in time, the exposed image will also be modulated in a periodic pattern. This effect, which is called exposure strobing, can result in undesirable streaks on the output copy (obtained by transferring the developed image from the photoconductor surface). Strobing can be caused by various factors originating within the optical system. As one example, when the document illumination source is operated on line current, the lamp actually produces an illumination output which is flashing at the rate of 120 Hz. This results in a periodic variation in exposure on the photoreceptor surface in the direction of motion of the photoconductor surface (perpendicular to the exposure slit). One method of compensating for this lamp strobing effect is to increase the frequency of the illumination lamps as taught in U.S. Pat. No. 3,998,539 assigned to the same assignee as the present invention. A second method is to place a transmission filter into the optical path, the filter having predetermined transmittance characteristics to provide a spatial irradiance profile having a zero Fourier transform at the spatial frequency produced by the modulated illumination. This method is disclosed in U.S. Pat. No. 4,226,527 assigned to the same assignee as the present invention.

A second cause of exposure strobing can result from mechanical vibration of the various components comprising the optical system and, particularly, vibrations of the scan/illumination lamp as it accelerates during a scan mode. The natural frequency of the lamp sets up vibrations during scan acceleration. This vibration may produce a strobing effect at the photoreceptor if it has not damped out during prescan. One method of compensating for this type of vibrative strobing is to increase the natural frequency of the illumination lamp used in the scanning system as disclosed in co-pending application Ser. No. 865,324, assigned to the same assignee as the present invention.

Another common cause of strobing is the nonuniform (vibratiang) motion of the photoconductor. According to the present invention, there are described several types of optical transmission filters having specified transmittance functions to eliminate mechanical strobing originating from photoconductor vibration. It has been found that strobing is eliminated if the Fourier transform of the spatial irradiance profile at the photoconductor is zero, the transform evaluated at the frequency of the vibrating component. A transmission filter with predetermined transmittance characteristics can be disposed in the image path to provide a spatial irradiance profile having a zero Fourier transform at the required spatial frequency. In other words, a transmission filter having specified transmission characteristics interposed in the image path is used to eliminate mechanical strobing.

For a better understanding of the present invention reference may be had to the accompanying drawings wherein the same reference numerals have been applied to like parts and wherein.

DESCRIPTION

Figure 1:
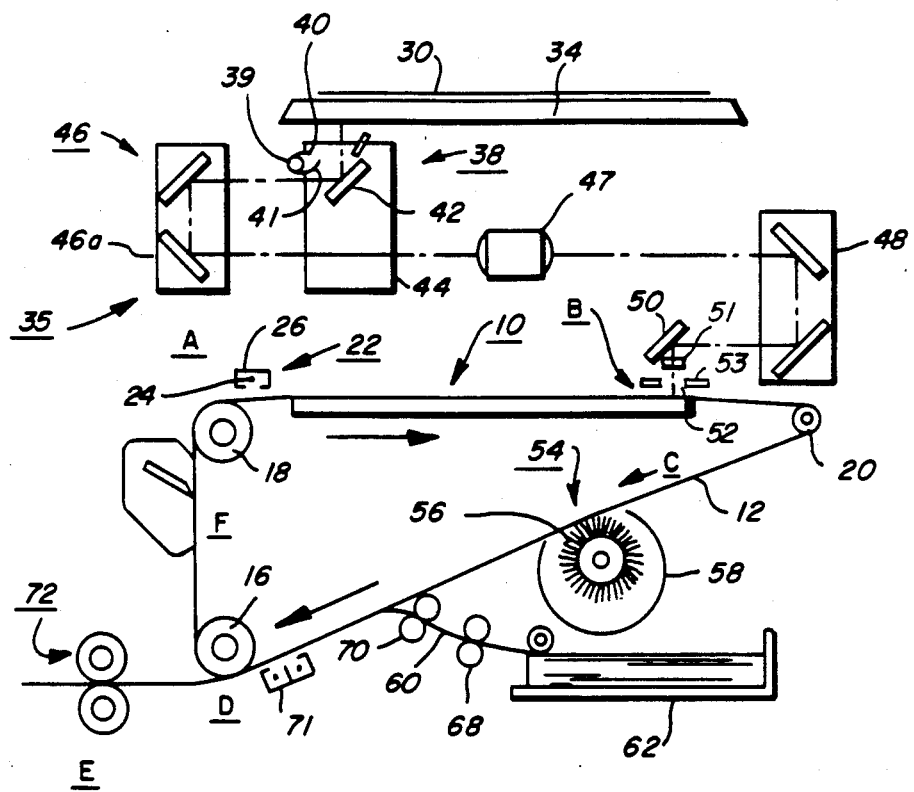
FIG. 1 is a side view of a document scanning system utilizing the transmission filter of the present invention.

FIG. 1 schematically depicts the various components of an illustrative electrophotographic printing machine incorporating the transmission filter of the present invention therein. It will become apparent from the following discussion that the present invention is equally well suited for use in a wide variety of electrophotographic reproduction machines and is not necessarily limited in its application to the particular embodiment shown herein.

Inasmuch as the art of electrophotographic reproduction is well known, the various processing stations employed in the FIG. 1 printing machine will be shown hereinafter schematically and their operation described briefly with reference thereto.

Turning now to FIG. 1, the electrophotographic printing machine uses a photoreceptor belt 10 having a photoconductive surface 12 formed on a conductive substrate. Belt 10 moves in the indicated direction, advancing sequentially through the various xerographic process stations. The belt is entrained about drive roller 18 and tension rollers 16, 20. Roller 18 is driven by conventional motor means, not shown.

With continued reference to FIG. 1, a portion of belt 10 passes through charging station A where a corona generating device, indicated generally by the reference numberal 22, charges photoconductive surface 12 to a relative high, substantially uniform, negative potential. Device 22 comprises a charging electrode 24 and a conductive shield 26.

As belt 10 continues to advance, the charged portion of surface 12 moves into exposure station B. An original document 30 is positioned on the surface of a transparent platen 34. Optics assembly 35 contains the optical components which incrementally scan-illuminate the document from left to right and project a reflected image onto surface 12 of belt 10, forming a latent image of the document thereon. Shown schematically, these optical components comprise an illumination lamp assembly 38, comprising an elongated tungsten illumination lamp 39 and associated elliptical reflectors 40 and 41. Assembly 38, including full rate scan mirror 42, is mounted on a scan carriage 44. The carriage ends are adapted to ride along guide rails (not shown) so as to travel along a path parallel to and beneath, the platen. Lamp 39, in conjunction with reflectors 40, 41, illuminates an incremental line portion of document 30. The reflected image is reflected by scan mirror 42 to corner mirror assembly 46 mounted on a second scan carriage 46a. Scan carriage 46a is mechanically connected to carriage 44 and adapted to move at ½ the rate of carriage 44. The document image is projected through lens 47 and reflected by a second corner mirror assembly 48 and by belt mirror 50, onto surface 12 to form thereon an electrostatic latent image corresponding to the informational areas contained within original document 30. The image of the document is defined at the photoconductor surface by a transmission filter 51 overlying an aperture plate 53 defined by an elongated aperture plate 53. Filter 51 has, according to the invention, a transmission profile defined more fully below.

At development station C, a magnetic brush development system, indicated generally by the reference numeral 54, advances an insulating development material into contact with the electrostatic latent image. Preferably, magnetic brush development system 54 includes a developer roller 56 within a housing 58. Roller 56 transports a brush of developer material comprising magnetic carrier granules and toner particles into contact with belt 10. Roller 56 is positioned so that the brush of developer material deforms belt 10 in an arc with the belt conforming, at least partially, to the configuration of the developer material. The thickness of the layer of developer material adhering to developer roller 56 is adjustable. The electrostatic latent image attracts the toner particles from the carrier granules forming a toner powder image on photoconductive surface 12.

Continuing with the system description, an output copy sheet 60 taken from a supply tray 62 is moved into contact with the toner powder image at transfer station D. The support material is conveyed to station D by a pair of feed rollers 68, 70. Transfer station D includes a corona generating device 71 which sprays ions onto the backside of sheet 60, thereby attracting the toner powder image from surface 12 to sheet 60. After transfer, the sheet advances to fusing station E where a fusing roller assembly 72 affixes the transferred powder image. After fusing, sheet 60 advances to an output tray (not shown) for subsequent removal by the operator.

After the sheet of support material is separated from belt 10, the residual toner particles and the toner particles of developed test patch areas / are removed at cleaning station F.

Subsequent to cleaning, a discharge lamp, not shown, floods surface 12 with light to dissipate any residual charge remaining thereon prior to the charging thereof for the next imaging cycle.

A controller (not shown) incorporating a suitable microprocessor and memory, is provided for operating in predetermined timed relationships, the various components that comprise machine 10, including the document scan drive components to reproduce the document 30 onto copy sheet 60, as will be understood by those familiar with the art.

Due to the vibrations of the photoconductor, successive points on the photoconductor will be exposed for different periods of time which could result in different exposures for different points.

Figure 2:
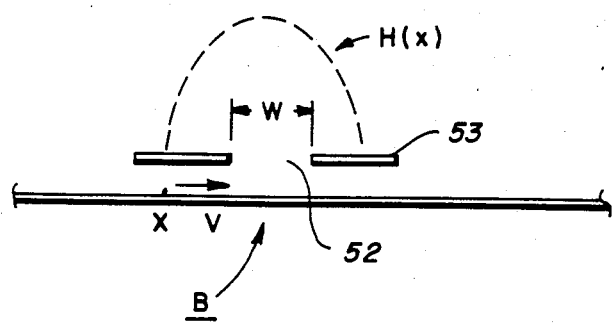
FIG. 2 shows an irradiance profile H(x) distributed across the exposure slit shown in FIG. 1.

The photoconductor illumination geometry is shown in FIG. 2. Generally the illumination profile is truncated by an exposure slit 52 of width W. Consider a point on the photoconductor with coordinate x(t), that vibrates as it moves through the exposure zone, B in the process direction, X. Its position relative to the leading edge of the exposure slit (x'=0) is generally given by $$x(t) = x' + V_o t + \Delta \sin(\omega t + \Phi) \tag{1}$$

where $x'$ is an arbitrary position, $V_o$ is a constant velocity, $\omega$ is the vibration (radian) frequency, $\Phi$ is an arbitrary phase constant and $\Delta$ is the amplitude of the vibration. The velocity of the point is given by $$V(t) = V_o + \Delta\omega \cos(\omega t + \Phi) \tag{2}$$

It can be seen that $V_o$ also is the average velocity of the photoconductor. The modulation of the velocity is given by $$m = \frac{V_{max} - V_{min}}{V_{max} + V_{min}} = \frac{\omega \Delta}{V_o} \tag{3}$$

The variable $\Phi$ represents the phase of vibration of the point as it enters the exposure region. For $x'=0$ and $0 < \Phi < \pi$, the position of the point is positive at $t=0$, which means that this point entered the slit at $t<0$. For $\Phi = \pi$ the point enters the slit exactly at $t=0$, while for $\pi < \Phi < 2\pi$ the point enters the slit at $t>0$. Since it is possible for a point that enters early ($t<0$) to also exit late ($t > W/v_o$) and vice versa, it is therefore possible for different points to receive different amounts of exposure as a result of the mechanical vibrations.

The times at which a point enters the exposure slit, $t_1$, and exits, $t_2$, can be determined from $$x' + V_o t_1 + \Delta \sin(\omega t_1 + \Phi) = 0 \tag{4}$$

and $$x' + V_o t_2 + \Delta \sin(\omega t_2 + \Phi) = W \tag{5}$$

Figure 3:
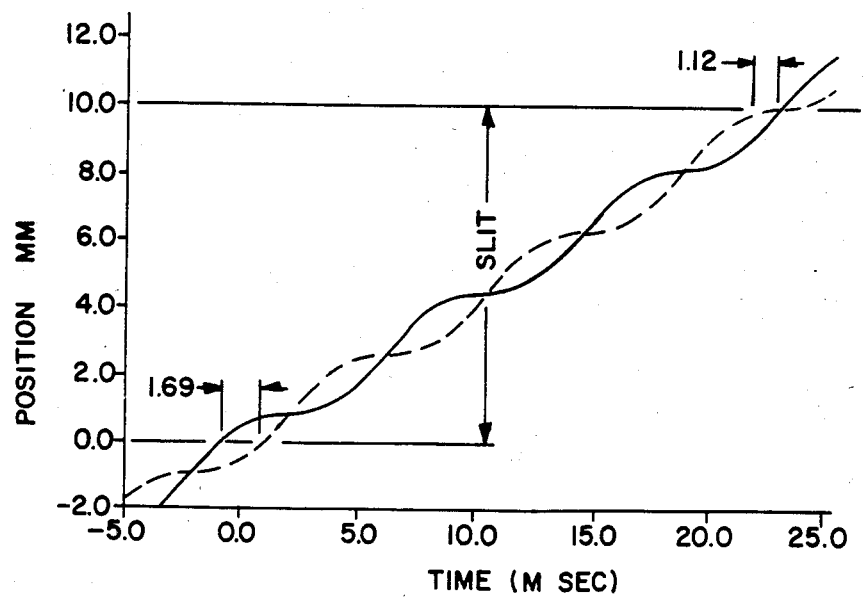
FIG. 3 is a plot of the position of two photoconductor points that enter the exposure slit at different times.

FIG. 3 is a plot of the position of two photoconductor points that enter the exposure slit at different times ($t_1$). The positions were calculated from Equation (1) for two different values of the phase constant $\Phi$. The amplitude of the modulation is large to demonstrate the effect. The point having $\Phi = 1.63$ radians enters the slit 1.69 msec before the point with $\Phi = 4.77$ radians. The points exit the slit at $X = W = 10$ mm. An additional exposure time difference of 1.12 msec occurs here since the point that enters early exits late. In this example there is a 7% difference in total exposure time for the two points. This variation in exposure time for points on the photoconductor will generally give rise to a variation in exposure of the points (strobing). The minimum and maximum values of total exposure time T are given respectively by the expressions $$T_{(min)} = \frac{W}{V_o} - \frac{2\Delta}{V_o} \sin\left(\frac{\omega W}{2V_o}\right) \tag{6}$$

$$T_{(max)} = \frac{W}{V_o} + \frac{2\Delta}{V_o} \sin\left(\frac{\omega W}{2V_o}\right) \tag{7}$$

The photoconductor exposure modulation is obtained from the maximum and minimum exposures, $$M = \frac{E_{max} - E_{min}}{E_{max} + E_{min}} \quad (8)$$

The exposure modulation will depend on the time spent within the exposure slit as well as the illumination profile over the slit.

For a uniform illumination profile the exposure is simply given by the product of the constant irradiance, $H_o$, and the time spent in the exposure slit, T. Thus $$E = H_o T \quad (9)$$

The exposure modulation is then the same as the time modulation. In this case:

$$M = \frac{T_{max} - T_{min}}{T_{max} + T_{min}} \quad (10)$$

Figure 4:
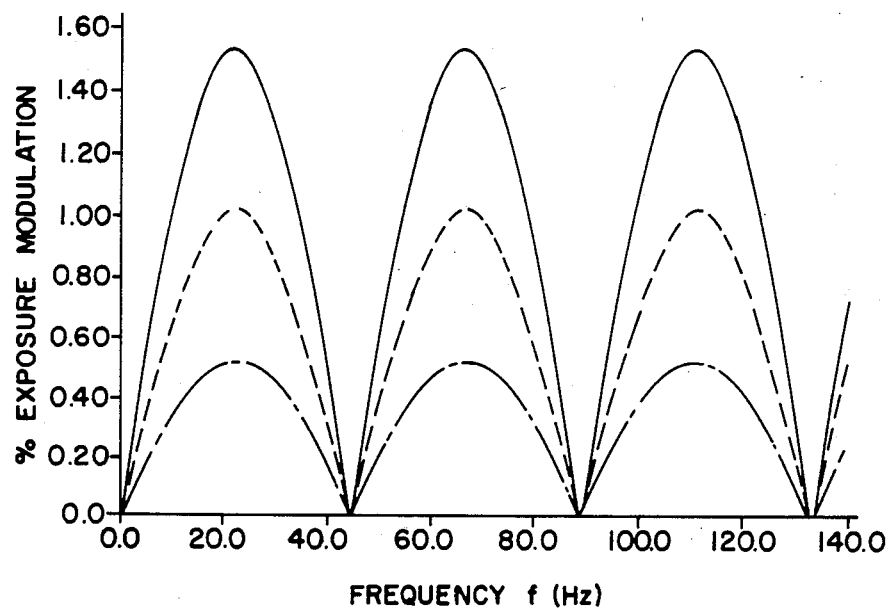
FIG. 4 is a plot of exposure modulation vs. vibrational frequency.

After substituting the values of $T_{max}$ and $T_{min}$ given by Equations (6) and (7) into Equation (10), we obtain $$M = \left(\frac{2\Delta}{W}\right) \left| \sin\left(\frac{\omega W}{2V_o}\right) \right| \quad (11)$$

or $$M = \left(\frac{2\pi f \Delta}{V_o}\right) |\mathrm{sinc}(fW/V_o)| \quad (12)$$

where $\mathrm{sinc}(\zeta) = \sin(\pi\zeta)/\pi\zeta$ and where f is the temporal frequency ($f = \omega/2\pi$). As a function of frequency the exposure modulation is the absolute value of the sine function, which is plotted in FIG. 4. The amplitude of the modulation is proportional to the amplitude of the oscillation, $\Delta$, divided by the slit width, W. It can be seen that there are particular frequencies which yield zero modulation. From Equation (11), the zeros are given by $$\pi f W/V_o = n\pi$$

or $$f = nV_o/W \quad n = 1, 2, 3, \ldots \quad (13)$$

Figure 5:
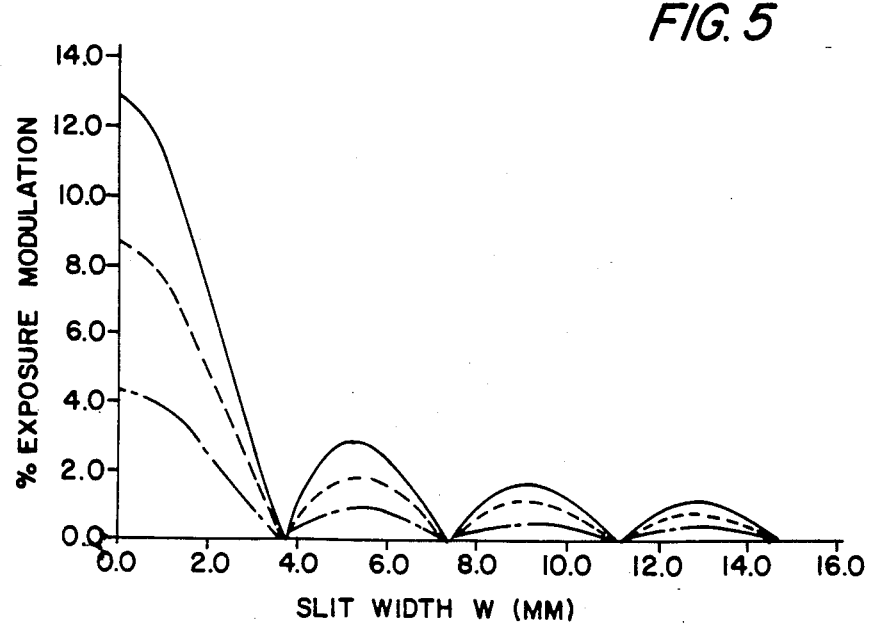
FIG. 5 is a plot of exposure modulation vs. slit width.

The modulation as a function of slit width is given by Equation (12) and plotted in FIG. 5. The maximum amplitude of the modulation (at W=0) is given by $(2\pi f \Delta/V_o)$ which is the velocity modulation, m. The exposure modulation is zero at slit widths W given by $$W = nV_o/f \quad (14)$$

which agrees with Equation (13).

As an example, consider the following system parameters: W=10 mm, f=100 Hz, $v_o$=400 mm/sec. If the vibration amplitude is $\Delta$=0.1 mm, the exposure modulation given by Equation (12) is M=2%. The spatial frequency of the modulation is $u = f/v_o = 0.25$ cy/mm. With high sensitivity development systems, this exposure modulation would result in undesirable streaks on the copy.

With a low velocity modulation, it can be demonstrated that the exposure modulation M is proportional to the velocity modulation m and to the Fourier transform of the irradiance profile. Thus, $$M = m \frac{|\tilde{H}(u_i)|}{\tilde{H}(o)} \quad (15)$$

where $\tilde{H}$ is the Fourier transform of the irradiance profile and $u_1$ represents a spatial frequency of the exposure modulation generated by the vibration at temporal frequency $f_1$; i.e., $$u_i = f_i/V_o \quad (16)$$

where $V_o$ is the average photoconductor velocity. Thus to eliminate exposure modulation, it is sufficient to require that the Fourier transform $\tilde{H}(u_i)$ is zero. For example, if the photoconductor is moving at an average velocity of 400 mm/sec and vibrating at 80 Hz, then a uniform irradiance profile, $$H(x) = \mathrm{rect}(x/W) = 1, \quad \frac{-W}{2} \leq x \leq \frac{W}{2} \quad (17)$$

will eliminate the vibrational strobing if the width W is properly chosen. In this case $$W = \frac{V_o}{f} = \frac{400}{80} = 5.0 \text{ mm} \quad (18)$$

The desired irradiance profile to eliminate vibrational strobing may be obtained through the use of an appropriate variable density optical filter designed to incorporate the transmission characteristics of the appropriate Fourier transform.

Figure 6:
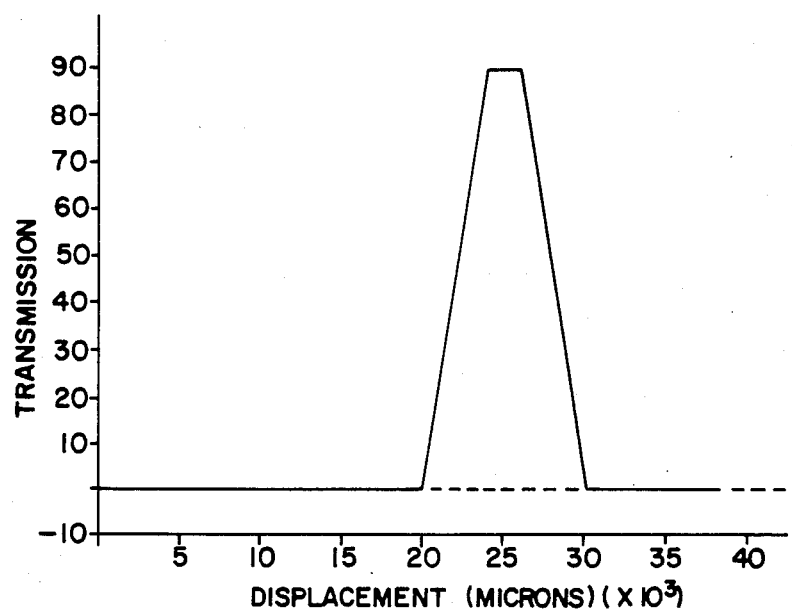
FIG. 6 shows an irradiance profile designed to eliminate mechanical strobing within a given frequency range.

If the system has appreciable vibrations at several frequencies $f_1, f_2, f_3, \ldots$ then, to eliminate vibrational strobing, the Fourier transform of the irradiance profile must be zero at each of the corresponding spatial frequencies $u_1, u_2, u_3 \ldots$ The irradiance profile designed to eliminate strobing at all these frequencies may be derived from the convolution of several selected functions. That is, $$H(x) = H_1(x) * \ldots H_N(x) * H_{N+1}(x) \quad (19)$$

where the * indicates convolution and where $H_1(x)$ is chosen to eliminate strobing at frequency $f_1$, $$\tilde{H}_1(\pm f_1/V_o) = 0 \quad (20)$$

and so on. The arbitrary function $H_{N+1}(x)$ may be chosen to satisfy some other requirement (e.g. to compensate for $\cos^4$ variation of the lens). For example, if the system is vibrating at frequencies $f_1 = 100$ Hz and $f_2 = 66.7$ Hz, and the average photoconductor velocity is $V_o = 400$ mm/sec, then an irradiance profile that will eliminate the strobing is $$H(x) = \mathrm{rect}(x/W_1) * \mathrm{rect}(x/W_2) \quad (21)$$

where $W_1 = V_o/f_1 = 4$ mm and $W_2 = V_o/f_2 = 6$ mm. This irradiance profile is plotted in FIG. 6.

For certain reproduction machines, illumination strobing and vibrational strobing may be simultaneously present. For these cases, the photoconductor irradiance profile, H(x), should be shaped so as to satisfy the condition $$\widetilde{H}(\pm u_i) = 0 \quad (22)$$

where, in this case $\{u_i\}$ represents the set of spatial frequencies due to: (1) the oscillating illumination at frequency a, (2) the mechanical vibrations at frequencies $f_1, f_2, f_3, \ldots$ (3) the sum frequencies $(f_i+a)$, (4) the difference frequencies $|f_i-a|$, and (5) higher order frequencies such as $(nf_i+a)/V_o$, etc.. In most cases the higher order terms can be ignored since $\widetilde{H}$ is small at the higher frequencies. Thus we can generally obtain uniform exposure by requiring that the Fourier transform of the irradiance profile, satisfy the expressions $$\widetilde{H}(\pm a/V_o) \approx 0 \quad (22a)$$

$$\widetilde{H}(\pm f_i/V_o) = 0, \text{ for each } f_i \quad (22b)$$

$$\widetilde{H}\left(\pm \frac{f_i + a}{V_o}\right) = 0, \text{ for each } f_i \quad (22c)$$

$$\widetilde{H}\left(\pm \frac{|f_i - a|}{V_o}\right) = 0, \text{ for each } f_i \quad (22d)$$

The required irradiance profile may be constructed from a convolution as follows:

$$H(x) = H_1(x) * H_{21}(x) * H_{22}(x) * \ldots$$
$$* H_{31}(x) * H_{32}(x) * \ldots$$
$$* H_{41}(x) * H_{42}(x) * \ldots$$
(23)

where $H_1$ satisfies Equation (22a), the $H_{2i}$ satisfy Equation (22b), etc.. For example, the individual profiles may be rectangular functions of the appropriate widths, $$W_1 = V_o/a \quad (24a)$$
$$W_{2i} = V_o/f_i \quad (24b)$$
$$W_{3i} = V_o/(f_i = a) \quad (24c)$$

$$W_{4i} = \frac{V_o}{|f_i - a|} \quad (24d)$$

Figure 7:
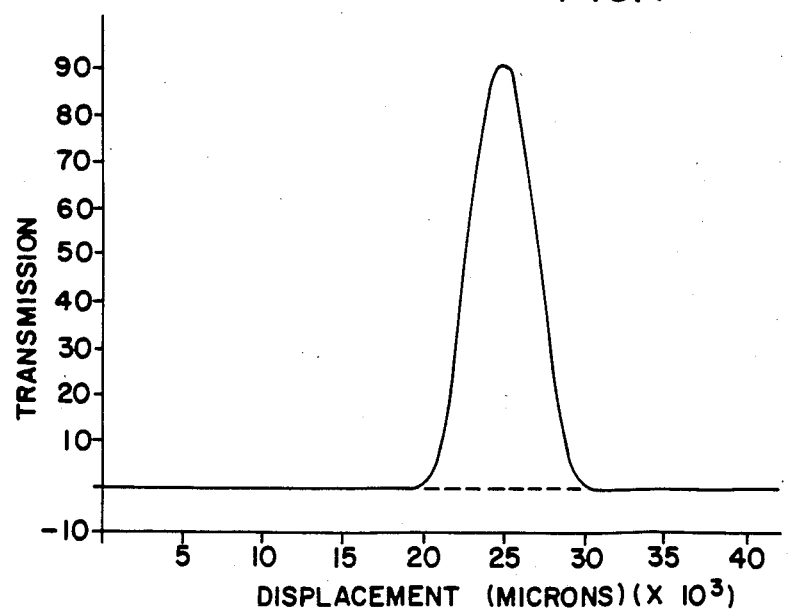
FIG. 7 shows an irradiance profile designed to eliminate a combination of illumination and mechanical strobing.

FIG. 7 shows an irradiance profile designed to eliminate strobing due to illumination oscillation at frequency a=120 Hz, and mechanical vibration at frequency f=50 Hz. The profile is constructed from four rect functions of widths $W_1$=2 mm, $W_2$=4.8 mm, $W_3$=1.41 mm, $W_4$=3.43 mm.

The desired irradiance profile may be achieved by means of a spatially varying optical filter placed along the optical path designed to incorporate the transmission characteristics of the appropriate Fourier transform.

There are also other means of obtaining the required irradiance profile such as through the use of a mirror with an appropriate variation of reflectance or through a means to produce an appropriate irradiance profile on the document.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. In a document scanning system wherein a plurality of optical components illuminates a document on an object plane and projects an image thereof along an optical path onto a photoconductor moving at a predetermined speed, the incident irradiance profile at the photoreceptor having a spatial variation across the surface defined by the expression $H_1(x)$, said system acquiring, during scan, a speed vibration of frequency f, giving rise to an exposure modulation at the photoreceptor surface given by the expression:

$$M = m \frac{|\widetilde{H}(f/V_0)|}{\widetilde{H}(o)}$$

where m (the magnitude of the velocity modulation)=$2\pi f \Delta/V_o$, $V_o$ is the average process velocity, $\Delta$ is the amplitude of the spatial vibration and $\widetilde{H}(f/V_o)$ is the Fourier transform of the illumination profile at the strobing spatial frequency, the improvement comprising a variable density filter disposed along the optical path having transmission characteristics such that the Fourier transformed function $\widetilde{H}_1(f/V_o)$=zero.

2. The system of claim 1 wherein the photoconductor is subject to vibrations at more than one frequency $f_i(i=1, \ldots N)$ and wherein the variable density filter disposed along the optical path has the characteristic $H(f_i/V_o)=0$ for each frequency $f_i$.

3. The system of claim 1 wherein the photoconductor is subject to vibrations at the frequencies $f_i$ as well as irradiance modulation at frequency a, and wherein the variable density filter disposed along the optical path has the spatial frequency characteristics described by $$\widetilde{H}(\pm a/V_o) = 0$$

$$\widetilde{H}(\pm f_i/V_o) = 0, \text{ for each } f_i$$

$$\widetilde{H}\left(\pm \frac{f_i + a}{V_o}\right) = 0, \text{ for each } f_i$$

$$\widetilde{H}\left(\pm \frac{|f_i - a|}{V_o}\right) = 0, \text{ for each } f_i$$

4. In a document scanning system wherein a plurality of optical components illuminates a document on an object plane and projects an image thereof along an optical path onto a photoconductor moving at a predetermined speed, the incident irradiance profile at the photoreceptor having a spatial variation across the surface defined by the expression $H_1(x)$, said system acquiring, during scan, a speed vibration of frequency f, giving rise to an exposure modulation at the photoreceptor surface given by the expression:

$$M = m \frac{|\widetilde{H}_1(f/V_0)|}{\widetilde{H}_1(o)}$$

where m (the magnitude of the velocity modulation)=$2\pi f\Delta/V_o$, $V_o$ is the average process velocity, $\Delta$ is the amplitude of the spatial vibration and $H(f/V_o)$ is the Fourier transform of the illumination profile at the strobing spatial frequency, the improvement comprising a reflector disposed along the optical path having reflectance characteristics such that the Fourier transformed function $H_1(f/V_o)$=zero.

* * * * *